(12) United States Patent
Lee et al.

(10) Patent No.: US 9,551,334 B2
(45) Date of Patent: Jan. 24, 2017

(54) VARIABLE CAPACITY COMPRESSOR HAVING A CONTROL VALVE WITH CHANNELS

(75) Inventors: Yong Ju Lee, Gyeonggi-do (KR); Geon Ho Lee, Gyeonggi-do (KR)

(73) Assignees: DOOWON TECHNICAL COLLEGE, Anseong-si, Gyeonggi-do (KR); DOOWON ELECTRONICS CO., LTD, Asan-si, Chungcheongnam-do (KR)

( * ) Notice: Subject to any disclaimer, the term of this patent is extended or adjusted under 35 U.S.C. 154(b) by 383 days.

(21) Appl. No.: 14/119,190

(22) PCT Filed: May 23, 2012

(86) PCT No.: PCT/KR2012/004077
§ 371 (c)(1),
(2), (4) Date: Nov. 20, 2013

(87) PCT Pub. No.: WO2012/161514
PCT Pub. Date: Nov. 29, 2012

(65) Prior Publication Data
US 2014/0248163 A1 Sep. 4, 2014

(30) Foreign Application Priority Data

May 23, 2011 (KR) .................. 10-2011-0048596
May 23, 2011 (KR) .................. 10-2011-0048597

(51) Int. Cl.
*F04B 27/18* (2006.01)
*B23P 15/00* (2006.01)
(Continued)

(52) U.S. Cl.
CPC .......... *F04B 27/1804* (2013.01); *B23P 15/001* (2013.01); *F04B 27/14* (2013.01);
(Continued)

(58) Field of Classification Search
CPC ... F04B 27/1054; F04B 27/14; F04B 27/1804; F04B 27/1813; F04B 27/1818; F04B 2027/1822; F04B 2027/1827; F04B 2027/1831; F04B 2027/1836; F04B 2027/1868; F04B 2027/1872; F04B 2027/1809; F04B 27/18; F04B 27/22; F04B 49/002
See application file for complete search history.

(56) References Cited

U.S. PATENT DOCUMENTS 7,128,304 B2    10/2006    Morisawa et al.
2005/0025632 A1*    2/2005    Urbank ............... F04B 27/1804
                                                         417/222.2
(Continued)

FOREIGN PATENT DOCUMENTS

JP    2005-127283 A    5/2005
JP    2009-057855 A    3/2009
(Continued)

*Primary Examiner* — Bryan Lettman
*Assistant Examiner* — Timothy Solak
(74) *Attorney, Agent, or Firm* — Revolution IP, PLLC (57) ABSTRACT

Provided is a control valve for a variable capacity compressor, the control valve including: a valve body including a crank-chamber port, a discharge port, a suction port, a control channel formed inside the control valve such that the crank-chamber port and the discharge port communicate with each other, and a first bleeding channel formed such that the crank-channel port and the suction port communicate with each other; an operating unit provided in the valve body and including a second bleeding channel communicated from a center area to a side surface of the operating unit; and a driving unit provided in the valve body and connected to the operating unit to enable the operating unit to reciprocally move according to a current applied by an external source.

12 Claims, 5 Drawing Sheets

(51) Int. Cl.
*F04B 27/14* (2006.01)
*F04B 45/02* (2006.01)

(52) U.S. Cl.
CPC .............. *F04B 27/18* (2013.01); *F04B 45/02* (2013.01); *F04B 2027/1827* (2013.01); *F04B 2027/1831* (2013.01); *F04B 2027/1845* (2013.01); *Y10T 29/49416* (2015.01); *Y10T 29/49425* (2015.01)

(56) References Cited

U.S. PATENT DOCUMENTS

| | | | |
|---|---|---|---|
| 2005/0211939 A1* | 9/2005 | Morisawa | F04B 27/1804 251/129.15 |
| 2006/0193733 A1* | 8/2006 | Kume | B23K 1/0008 417/222.2 |
| 2007/0214814 A1* | 9/2007 | Umemura | F04B 27/1804 62/228.1 |
| 2009/0035156 A1 | 2/2009 | Higashidozono et al. | |

FOREIGN PATENT DOCUMENTS

| | | |
|---|---|---|
| KR | 10-0515285 B1 | 9/2005 |
| KR | 10-0529716 B1 | 11/2005 |
| KR | 10-0572123 B1 | 4/2006 |
| KR | 10-2006-0044399 A | 5/2006 |

* cited by examiner

VARIABLE CAPACITY COMPRESSOR HAVING A CONTROL VALVE WITH CHANNELS

CROSS REFERENCE TO PRIOR APPLICATIONS

This application is a National Stage Application of PCT International Patent Application No. PCT/KR2012/004077 filed on May 23, 2012, under 35 U.S.C. §371, which claims priority to Korean Patent Application Nos. 10-2011-0048596 filed on May 23, 2011, and 10-2011-0048597 filed on May 23, 2011, which are all hereby incorporated by reference in their entirety.

TECHNICAL FIELD

The present invention relates to a control valve for a variable capacity compressor and a method of manufacturing the control valve, and more particularly, to a control valve for a variable capacity compressor and a method of manufacturing the control valve, which are capable of improving performance of the variable capacity compressor.

BACKGROUND ART

Generally, swash plate type compressors are widely used as compressors of air conditioning devices for cars, and are classified into various types according to compression methods and structures. Recently, variable capacity compressors that are capable of varying compression capacities are largely used. A capacity of the variable capacity compressor is adjusted by adjusting a gradient of a swatch plate. In other words, the capacity of the variable capacity compressor is reduced as the gradient of the swash plate is reduced by increasing a pressure in a crank chamber when an inflow amount of a refrigerant from a discharge chamber to the crank chamber is increased.

However, when a conventional variable capacity compressor is initially operated after being neglected for a certain period of time, specifically in summer, a pressure in a suction chamber is increased or a pressure in a crank chamber is increased by a liquid refrigerant, thereby delaying an operation of the conventional variable capacity compressor, and thus it is difficult to obtain a quick cooling performance. In addition, an explosion or noise caused by the explosion may be generated when the conventional variable capacity compressor is operated.

Meanwhile, a conventional control valve for a compressor includes a valve body, a driving unit provided in the valve body, and an operating unit provided in the valve body and reciprocally moving by the driving unit.

However, since the valve body and the operating unit of the conventional control valve are formed of a magnetic material, a non-magnetic material is fixed between the valve body and the operating unit so that the operating unit is smoothly reciprocally moved. At this time, it may be difficult to fix the non-magnetic material and fixability of the non-magnetic material may not be satisfactory in the conventional control valve.

DETAILED DESCRIPTION OF THE INVENTION

Technical Problem

The present invention provides a control valve for a variable capacity compressor, which is capable of improving a performance of the variable capacity compressor by resolving a delay of an operation caused by a liquid refrigerant during an initial operating stage of the variable capacity compressor.

The present invention also provides a control valve for a compressor and a method of manufacturing the control valve, which are capable of improving productivity since mass production is facilitated by easily and strongly fixing a non-magnetic material.

Technical Solution

According to an aspect of the present invention, there is provided a control valve for a variable capacity compressor, which pressurizes a refrigerant sucked from a suction chamber by using a plurality of pistons that reciprocally move by being combined to a swash plate disposed in a crank chamber, and then discharges the refrigerant to a discharge chamber, the control valve including: a valve body externally including a crank-chamber port communicating with the crank chamber, a discharge port communicating with the discharge chamber, and a suction port communicating with the suction chamber, and internally including a control channel formed such that the crank-chamber port and the discharge port communicate with each other, and a first bleeding channel formed such that the crank-chamber port and the suction port communicate with each other; an operating unit provided inside the valve body and including a second bleeding channel communicating from a center area to a side surface of the operating unit; and a driving unit provided inside the valve body and reciprocally moving the operating unit according to a current applied from an external source, wherein when the variable capacity compressor is in a normal state, the control channel is opened and the first and second bleeding channels are closed, and thus the refrigerant in the discharge chamber flows through the control channel and enters the crank chamber to control an angle of the swish plate by adjusting a pressure in the crank chamber, and when a pressure in the suction chamber is increased or the pressure of the crank chamber is in an abnormally high bleeding state, the operating unit is moved to close the control channel and the first and second bleeding channels are communicated with each other and opened, and thus the refrigerant in the crank chamber flows through the first and second bleeding channels and enters the suction chamber, thereby lowering the pressure in the crank chamber.

In the valve body, at least one crank-chamber port may be formed at a side surface of one end, at least one discharge port may be formed at an outer circumferential side surface, at least one suction port may be spaced apart from the at least one discharge port at the outer circumferential side surface, the control channel may be formed in an axial direction from the at least one crank-chamber port and in a circumferential direction towards the at least one discharge port, and the first bleeding channel may be formed in the axial direction from the at least one crank-chamber port and in the circumferential direction towards the at least one suction port.

The driving unit may include: a needle disposed in the valve body; and a solenoid provided at the valve body to apply an operating force for reciprocally moving the operating unit.

The operating unit may include: a plunger slidably combined to another end of the needle; a feed valve unit combined to the plunger to open or close the control channel by interworking and moving with the plunger, and including the second bleeding channel penetrating through an axial center area from an inlet hole formed at one end of the feed valve unit to communicate with an outlet hole formed at the outer circumferential side surface and communicate with the first bleeding channel; and a bleeding valve unit provided in the feed valve unit and adjusting opening and closing of the second bleeding channel. The bleeding valve unit may include: a bellows disposed in the feed valve unit and expanding or contracting according to the pressure of the suction chamber; and a bleeding valve body combined to the bellows and moving according to the expansion or contraction of the bellows to open or close the second bleeding channel. The control valve may further include: a support member whose one end is combined to the needle and the other end is combined to one end of the bellows to support the bellows; a spring combined to the support member; and a stopper combined to the spring and restricting the movement of the bleeding valve body. The bleeding valve body may include: a valve sheet combined to the other end of the bellows; and a flow tube whose one end is combined to the valve sheet, an outer circumferential surface slidably moves while face-to-face contacting an inner circumferential surface of the feed valve unit, the other end includes a though hole to communicate with the second bleeding channel, and an outer circumferential side surface includes a discharge hole communicating with the second bleeding channel. The flow tube may include at least one refrigerant groove for the refrigerant to flow in such that the flow tube slidably moves. The at least one refrigerant groove may be formed in a spiral shape along an outer circumferential surface of the flow tube.

The feed valve unit may include a catching unit on the inner circumferential surface, and the valve sheet may include a flange externally protruding along a circumferential direction on the outer circumferential surface to open or close the second bleeding channel by moving according to the expansion or contraction of the bellows to contact or be separated from the catching unit.

The control valve may further include: a guide pipe disposed between the valve body and the operating unit, having a cylindrical pipe shape, having an inner circumferential surface into which the plunger is reciprocally movably inserted, and formed of a first non-magnetic material; and a first non-magnetic material layer disposed between the valve body and the guide pipe to fix the valve body and the guide pipe, and formed of a second non-magnetic material having a lower magnetic permeability than the first non-magnetic material.

The control valve may further include a needle housing surrounding and combined to an outer circumferential surface of one end of the needle, wherein one end of the guide pipe may extend to the needle housing to surround an outer circumferential surface of the needle housing, and the needle housing and the guide pipe may be fixed by forming a second non-magnetic material layer formed of the second non-magnetic material between the needle housing and the guide pipe. The first and second non-magnetic material layers may be formed as the second non-magnetic material melts and permeates between the valve body and the guide pipe and between the needle housing and the guide pipe via brazing. The guide pipe may be formed of stainless steel (SUS), and the second non-magnetic material may be formed of copper.

According to another aspect of the present invention, there is provided a method of manufacturing a control valve for a compressor, the control valve including a valve body formed of a magnetic material, a driving unit provided in the valve body, and an operating unit provided at the valve body and reciprocally moving by the driving unit, the method including: assembling the driving unit by penetrating and inserting one end of a needle through and into a plunger formed of a magnetic material in an axial direction and inserting the other end of the needle into a needle housing; assembling the driving unit and the guide pipe by inserting portions of outer circumferential surfaces of the plunger and the needle housing into an inner circumferential surface of a guide pipe having a cylindrical pipe shape and formed of a first non-magnetic material; slidably movably inserting and assembling the assembled driving unit and guide pipe into an insert hole formed on the valve body; and forming a non-magnetic material layer formed of a second non-magnetic material having a lower magnetic permeability than the first non-magnetic material, between the guide pipe and the valve body and between the guide pipe and the needle housing to fix the guide pipe and the valve body, and the guide pipe and the needle housing.

The forming of the non-magnetic material layer may include melting and permeating the second non-magnetic material between the guide pipe and the valve body and between the guide pipe and the needle housing via brazing.

The second non-magnetic material may have a ring shape and brazed by being inserted into one end of the guide pipe and an outer circumferential side surface of the needle housing, and into the valve body and an outer circumferential side surface of the guide pipe. An insert groove may be formed at one end of the guide pipe facing the needle housing and at one end of the valve body facing the needle housing so that the second non-magnetic material having the ring shape is inserted.

Advantageous Effects

A control valve for a variable capacity compressor and a method of manufacturing the control valve, according to one or more embodiments of the present invention have following effects.

First, a delay in an operation of the variable capacity compressor caused by a liquid refrigerant may be prevented, and operability of the variable capacity compressor in an initial operating stage may be improved even when the variable capacity compressor has not been used for a long period of time, thereby improving performance of the variable capacity compressor.

Second, since a non-magnetic material may be easily and firmly fixed, mass production is facilitated and productivity is improved.

BEST MODE

Hereinafter, the present invention will be described more fully with reference to the accompanying drawings, in which exemplary embodiments of the invention are shown.

Figure 1:
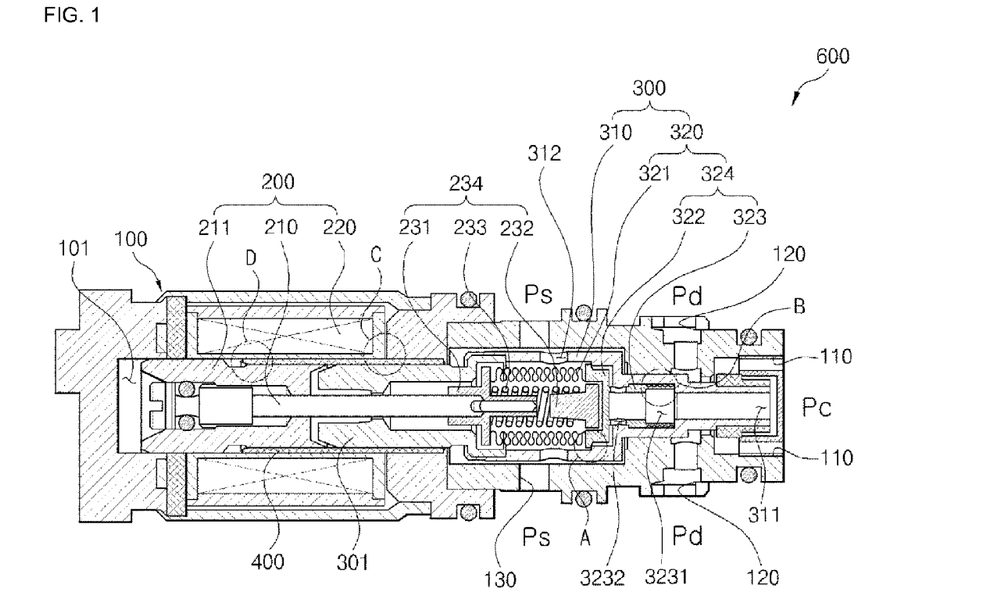
FIG. 1 is a cross-sectional view of an internal structure of a control valve for a variable capacity compressor, according to an embodiment of the present invention.

First, referring to FIG. 1, in a control valve 600 for a variable capacity compressor (not shown, hereinafter referred to as a compressor), according to an embodiment of the present invention, a refrigerant sucked by a suction chamber is pressurized and then discharged to a discharge chamber by using a plurality of pistons (not shown) that reciprocally moves by being combined to a swash plate (not shown) disposed in a crank chamber of the compressor. Here, the compressor may have a structure disclosed in, for example, KR 529716, KR 515285, or KR 572123.

The control valve 600 includes a valve body 100, a driving unit 200, and an operating unit 300. An inert hole 101 in which the driving unit 200 and the operating unit 300 may be disposed is formed in the valve body 100, a plurality of crank-chamber ports 110 communicating with the crank chamber are formed on the outside of an end of the valve body 100, a plurality of discharge ports 120 communicating with the discharge chamber are formed on an outer circumferential side surface of the valve body 100, and a plurality of suction ports 130 spaced apart from the plurality of discharge ports and communicating with the suction chamber are formed on the outer circumferential side surface.

Also, the valve body 100 internally includes a control channel (refer to FIG. 3) formed such that the crank-chamber port 110 and the discharge port 120 communicate with each other, and a first bleeding channel (refer to FIG. 4) formed such that the crank-chamber port 110 and the suction portion 130 communicate with each other.

The control channel is formed in an axial direction from the crank-chamber port 110 and along a circumferential direction towards the discharge port 120. The first bleeding channel is formed in the axial direction from the crank-chamber port 110 to share a corresponding region with the control channel and along the circumferential direction towards the suction port 130 while extending in the axial direction of the control channel.

The driving unit 200 is disposed inside the valve body 100 and enables the operating unit 300 to reciprocally move according to a current applied from an external source. The driving unit 200 includes a needle 210 disposed in the axial direction of the insert hole 101, and a solenoid 220. The needle 210 is disposed inside the valve body 100 in the axial direction, and has one end combined to a needle housing 211. The needle housing 211 is inserted into and combined to the insert hole 101 while surrounding an outer circumferential surface of the end of the needle 210 so as to support the needle 210.

The solenoid 220 is combined to the needle 210 and one end of the needle housing 211 along the outer circumferential surface inside the valve body 100 to apply an operating force to the operating unit 300, thereby enabling the operating unit 300 to reciprocally move along the axial direction. Here, the solenoid 220 is a solenoid including a coil, and may have any structure as long as the operating force is applied to the operating unit 300 according to a current applied from an external source. Since the structure of the solenoid 220 is similar to that of a well-known solenoid, details thereof are omitted herein.

The operating unit 300 is disposed in the insert hole 101, is reciprocally moved by the driving unit 200, and selectively opens or closes the control channel and the first bleeding channel. In detail, the operating unit 300 includes a plunger 301, a feed valve unit 310 combined to the plunger 301 to interwork and move with the plunger 301 to close or open the control channel and including a second bleeding channel communicating with the first bleeding channel, and a bleeding valve unit 320 disposed in the feed valve unit 310 to adjust opening or closing of the second bleeding channel.

The plunger 301 surrounds and is slidably combined to an outer circumferential surface of the other end of the needle 210, and reciprocally moves in the axial direction along the needle 210 by the driving unit 200.

The feed valve unit 310 is combined to the plunger 301 to move in the axial direction by interworking with the movement of the plunger 301, opens or closes the control channel according to the movement in the axial direction, and includes the second bleeding channel. Here, the second bleeding channel is penetrated along an axial center area from an inlet hole 311 formed at one end of the feed valve unit 310 while communicating with an outlet hole 312 formed on the outer circumferential side surface, and communicates with the first bleeding channel. Meanwhile, the feed valve unit 310 includes a catching unit 3110 on an inner circumferential surface, which is described later.

The bleeding valve unit 320 is disposed in the feed valve unit 310, combined to the other end of the needle 210 and moves according to a pressure of the suction chamber to adjust opening or closing of the second bleeding channel formed in the feed valve unit 310, and includes a bellows 321 and a bleeding valve body 324.

The bellows 321 expands or contacts according to a pressure, and thus expands or contracts according to the pressure of the suction chamber by being disposed along the axial direction in the feed valve unit 310. According to such expansion and contraction, the bellows 321 moves in the axial direction of the valve body 100. Here, an end of the bellows 321 is combined to a support member 231 that will be described later.

The bleeding valve body 324 is combined to the bellows 321 to move according to the expansion or contraction of the bellows 321, thereby opening or closing the second bleeding channel, and includes a valve sheet 322 and a flow tube 323.

Figure 2:
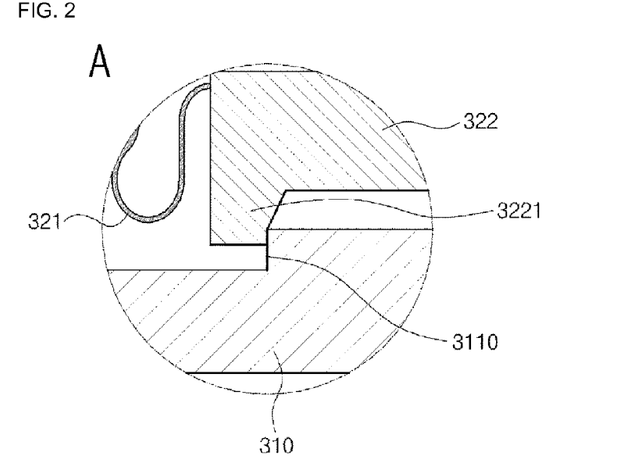
FIG. 2 is an enlarged view of a region A of FIG. 1.

One end of the valve sheet 322 is combined to the other end of the bellows 321 to move in the axial direction according to the expansion and contraction of the bellows 321. Referring to FIG. 2, the valve sheet 322 includes a flange 3221 externally protruding along a circumferential direction on the outer circumferential surface, and the flange 3221 will be described in detail later.

The flow tube 323 has a pipe shape, has one end integrally combined to the other end of the valve sheet 322, and communicates with the second bleeding channel. In detail, the flow tube 323 has an outer circumferential surface face-to-face contacting an inner circumferential surface of the feed valve unit 310 such that the flow tube 323 slidably moves, has the other end including a through hole 3231 communicating with the inlet hole 311 and with the second bleeding channel, and has an outer circumferential side surface including a discharge hole 3232 communicating with the second bleeding channel. Accordingly, a refrigerant in the flow tube 323 moves to a center in the axial direction through the through hole 3231 and then is discharged to the discharge hole 3232.

In addition, according to the current embodiment, the feed valve unit 310 further includes a support 234 disposed therein. The support 234 includes the support member 231, a stopper 232, and a spring 233. A location of the support member 231 is fixed as the support member 231 is combined to the needle 210, and another end of the support member 231 is combined to one end of the bellows 321 so that the support member 231 supports the bellows 321. The spring 233 is disposed in the bellows 321, has one end inserted into and combined to the support member 231, and has the other end combined to the stopper 232, thereby buffering the movement of the stopper 232. The stopper 232 is combined to the other end of the spring 233 and spaced apart from the bleeding valve body 324 so as to limit the movement of the bleeding valve body 324.

Meanwhile, according to the current embodiment, a refrigerant flow space A is formed between the outer circumferential side surface of the valve sheet 322 and the inner circumferential surface of the feed valve unit 310 such that the refrigerant discharged from the discharge hole 3232 flows to the outlet hole 312. The refrigerant flow space A forms the first and second bleeding channels.

According to the current embodiment, since the catching unit 3110 formed on the inner circumferential surface of the feed valve unit 310 and the flange 3221 formed on the outer circumferential surface of the valve sheet 322 are disposed on the refrigerant flow space A, the valve sheet 322 moves according to the expansion or contraction of the bellows 321 and contacts or is separated from the catching unit 3110 to open or close the refrigerant flow space A, thereby opening or closing the second bleeding channel. Here, in the current embodiment, the second bleeding channel is opened or closed as the flange 3221 of the valve sheet 322 and the catching unit 3110 contact each other, and at this time, since the second bleeding channel is opened or closed by a ring-shaped region where the flange 3221 and the catching unit 3110 contact each other, an opening and closing control area is large, and thus the second bleeding channel may be accurately and stably opened or closed. Meanwhile, in FIG. 1, a reference numeral Pc denotes a refrigerant pressure in the crank chamber, a reference numeral Pd denotes a refrigerant discharge pressure, and a reference numeral Ps denotes a refrigerant suction pressure.

Figure 3:
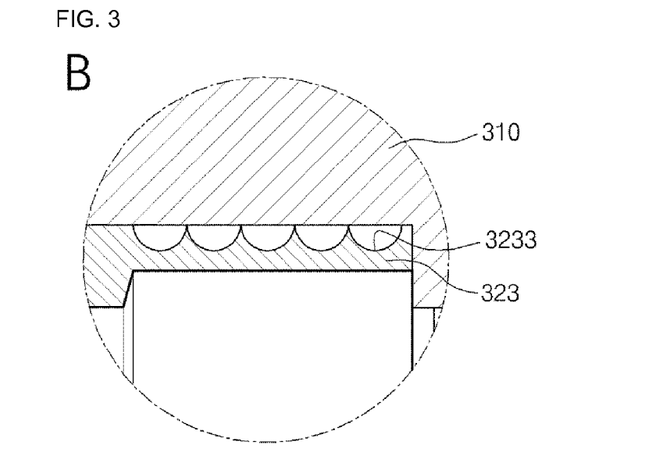
FIG. 3 is an enlarged view of a region B of FIG. 1.

In the current embodiment, the outer circumferential surface of the flow tube 323 and the inner circumferential surface of the feed valve unit 310 slidably face-to-face contact each other, and here, one or more refrigerant grooves 3233 are formed on the outer circumferential surface of the flow tube 323. Referring to FIG. 3, the refrigerant groove 3233 enables the refrigerant to flow so as to reduce a frictional force between the outer circumferential side surface of the flow tube 323 and the inner circumferential surface of the feed valve unit 310, thereby facilitating sliding of the flow tube 323 and the feed valve unit 310. The number of refrigerant grooves 3233 may be one or more according to circumstances, and the shape of the refrigerant groove 3233 may vary, for example, in a circumferential direction or an axial direction. In the current embodiment, the refrigerant groove 3233 has a spiral shape along the outer circumferential surface of the flow tube 323, but is not limited thereto.

Operations of the control valve 600 according to the current embodiment will now be described with reference to FIGS. 4 and 5. First, a normal state mentioned hereinafter denotes a normal state wherein an angle of the swash plate is controlled by adjusting the pressure in the crank chamber, and a bleeding state denotes an abnormal state wherein a bleeding channel is opened due to an increase in a pressure of the suction chamber or an abnormally high pressure of the crank chamber.

Figure 4:
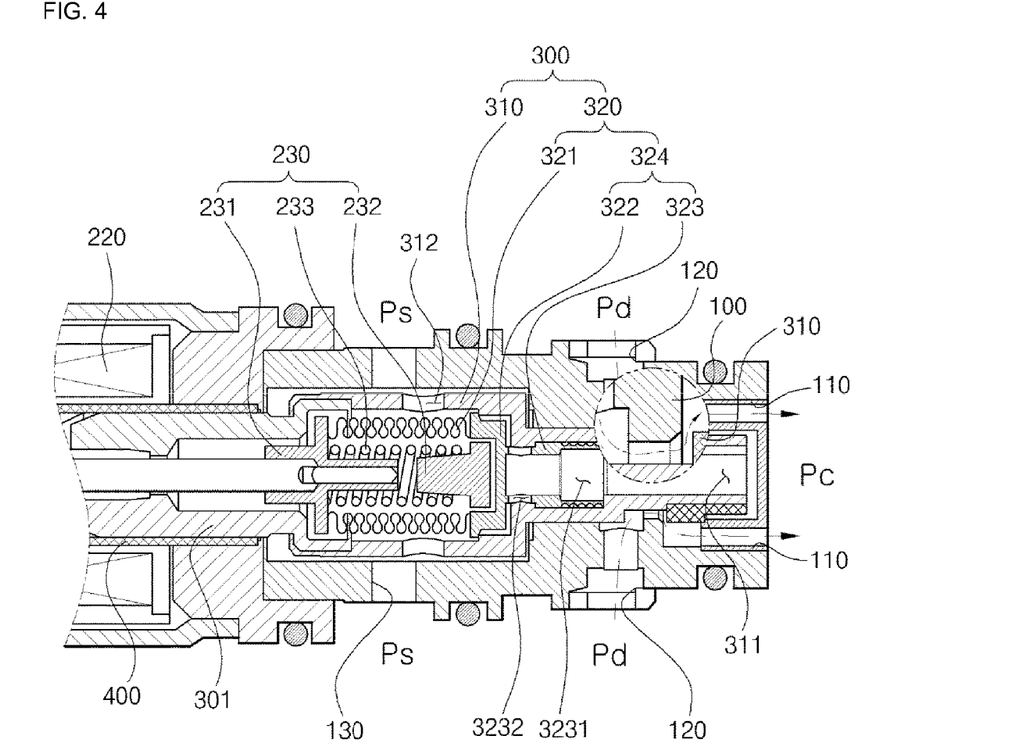
FIG. 4 is a cross-sectional view of an internal structure of the control valve of FIG. 1 when the control valve is in a normal state, and a flow of a refrigerant.
Figure 5:
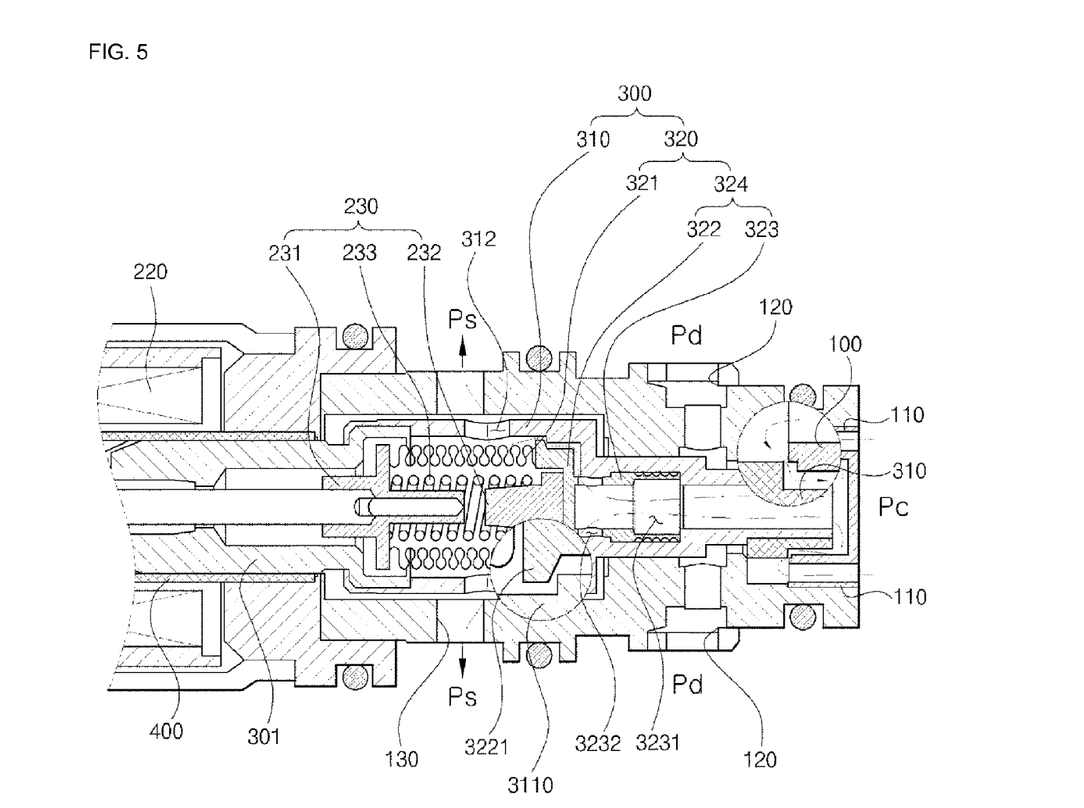
FIG. 5 is a cross-sectional view of an internal structure of the control valve of FIG. 1 when the control valve is in a bleeding state, and a flow of a refrigerant.

FIG. 4 is a cross-sectional view showing an internal structure of the control valve 600 in the normal state. When the control valve 600 is in the normal state, the control channel is opened so that the angle of the swash plate is controlled by adjusting the pressure in the crank chamber, and the first and second bleeding channels are closed, and thus the refrigerant in the discharge chamber flows through the control channel to the crank chamber.

However, when the control valve 600 is in the bleeding state in which the pressure of the suction chamber is increased by being exposed to the sun for a long period of time or the pressure of the crank chamber is abnormally high due to a liquid refrigerant, an operation of the compressor may be delayed during an initial operating stage of the compressor.

Thus, in order to prevent the delay of the operation of the compressor in the bleeding state, the control valve 600 is controlled in the bleeding state according to the current embodiment. Operations of the control valve 600 in the bleeding state will now be described with reference to FIG. 5.

First, according to the current embodiment, in the bleeding state, the operating unit 300 is moved to close the control channel and open the first and second bleeding channels to communicate with each other, such that the refrigerant in the crank chamber flows into the suction chamber through the first and second bleeding channels, thereby dropping the pressure of the crank chamber.

In other words, according to the control valve 600 in the bleeding state, when the pressure Ps of the suction chamber increases, the bellows 321 contracts and the bleeding valve unit 320 moves to open the second bleeding channel, or the compressor activates and the operating unit 300 and the feed valve unit 310 move to the left to open the first bleeding channel, and thus the refrigerant in the crank chamber flows to the first and second bleeding channels and to the suction chamber, thereby dropping the pressure of the crank chamber.

Meanwhile, in the bleeding state, the pressure Pc of the crank chamber is decreased and the swash plate forms a maximum swash angle. Accordingly, a discharge amount of the compressor is increased and a temperature of an evaporator of an air conditioner including the compressor is rapidly decreased. As such, when the temperature of the evaporator is decreased, the pressure Ps of the suction chamber is decreased. When the pressure Ps of the suction chamber is decreased, the bellows 321 expands, and thus the bleeding valve unit 320 moves to close the second bleeding channel. Then, only the feed valve unit 310 proportional to an input current is operated, and thus the flow of the refrigerant from the crank chamber to the suction chamber is blocked.

As described above, the control valve 600 according to the current embodiment only opens the control channel in the normal state such that the refrigerant in the discharge chamber flows into the crank chamber through the control channel to adjust the pressure in the crank chamber, thereby controlling the angle of the swash plate. However, when the pressure of the suction chamber is increasing or the pressure of the crank chamber is abnormally high, the control valve 600 closes the control channel and opens the first and second bleeding channels such that the refrigerant in the crank chamber flows into the suction chamber, thereby effectively preventing the delay of the operation of the compressor.

The control valve 600 includes a guide pipe 400, a first non-magnetic material layer 510, and a second non-magnetic material layer 520, which will be described in detail with reference to FIGS. 6 and 7.

First, the valve body 100 and the plunger 301 are both formed of a magnetic material. Thus, the plunger 301 may not smoothly reciprocally move due to a magnetic force with the valve body 100. Accordingly, the guide pipe 400 formed of a first non-magnetic material having a high magnetic permeability is disposed between the plunger 301 and the valve body 100.

The guide pipe 400 is disposed between the valve body 100 and the plunger 301 and has a cylindrical pipe shape according to shapes of the plunger 301 and needle housing 211. The plunger 301 is reciprocally movably inserted into an inner circumferential surface of another end of the guide pipe 400. One end of the guide pipe 400 extends up to the needle housing 211 and surrounds the outer circumferential surface of the needle housing 211 as the needle housing 211 is inserted into an inner circumferential surface of the one end of the guide pipe 400.

Figure 6:
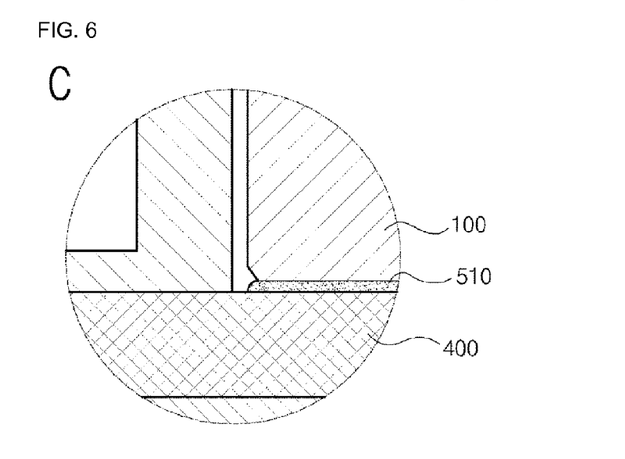
FIG. 6 is an enlarged view of a region C of FIG. 1.

Referring to FIG. 6, the first non-magnetic material layer 510 is disposed between the valve body 100 and the guide pipe 400 and integrally formed with the valve body 100 and the guide pipe 400 to fix the valve body 100 and the guide pipe 400, and is formed of a second non-magnetic material having a lower magnetic permeability than the first non-magnetic material.

Here, the first non-magnetic material layer 510 is formed by being melted and permeated between the valve body 100 and the guide pipe 400 by brazing the second non-magnetic material.

Figure 7:
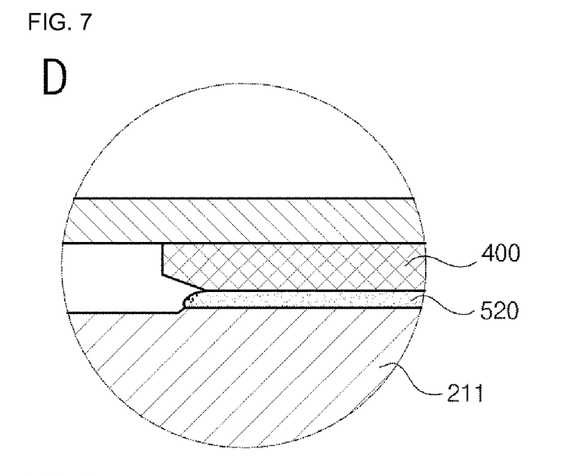
FIG. 7 is an enlarged view of a region D of FIG. 1.

Referring to FIG. 7, the second non-magnetic material layer 520 is disposed between the needle housing 211 and the guide pipe 400 and integrally formed with the needle housing 211 and the guide pipe 400 to fix the needle housing 211 and the guide pipe 400, and is formed of the second non-magnetic material. Like the first non-magnetic material layer 510, the second non-magnetic material layer 520 is melted and permeated between the needle housing 211 and the guide pipe 400 by brazing the second non-magnetic material.

The second non-magnetic material forming the first and second non-magnetic material layers 510 and 520 has the lower magnetic permeability than the first non-magnetic material so as to prevent resistance of reciprocal movement of the plunger 301 in the insert hole 101.

For example, the first non-magnetic material forming the guide pipe 400 may be stainless steel (SUS) having an excellent magnetic permeability and low corrosiveness, and the second non-magnetic material may be copper (Cu) or a copper alloy that easily melts via brazing and easily permeates into small gaps between the guide pipe 400 and the valve body 100 and between the guide pipe 400 and the needle housing after being melted.

Figure 8:
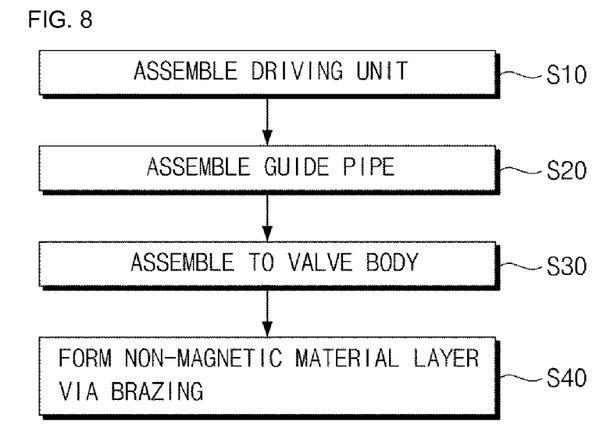
FIG. 8 is a flowchart illustrating a method of manufacturing a control valve for a variable capacity compressor, according to an embodiment of the present invention.
Figure 9:
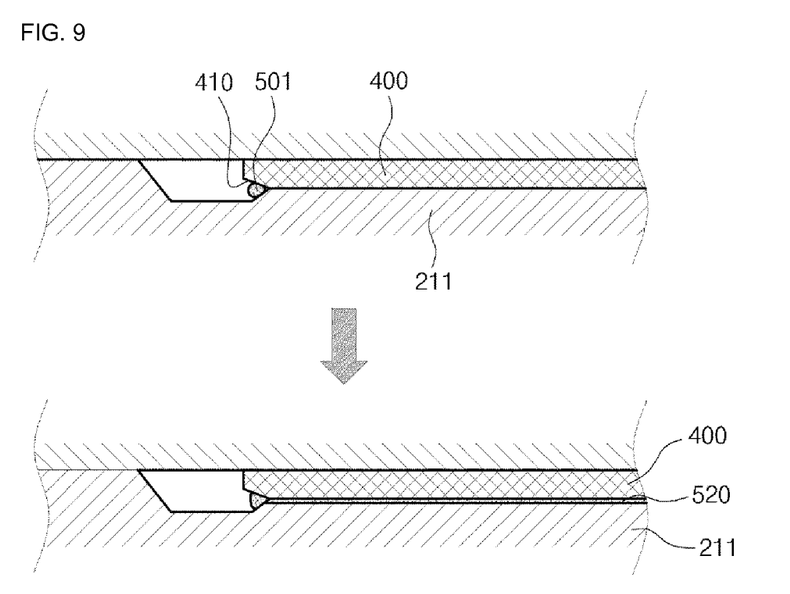
FIG. 9 is a view for describing forming a non-magnetic material layer via brazing in the method of FIG. 8.

FIG. 8 is a flowchart illustrating a method of manufacturing the control valve 600 for a variable capacity compressor, according to an embodiment of the present invention, and FIG. 9 is a view for describing forming a non-magnetic material layer via brazing in the method of FIG. 8.

Referring to FIG. 8, the method will be described mainly based on forming of the first and second non-magnetic material layers 510 and 520, and includes assembling the driving unit 200 in operation S10, assembling the guide pipe 400 in operation S20, assembling the valve body 100 in operation S30, and forming a non-magnetic material layer in operation S40.

In operation S10, the other end of the needle 210 is penetrated through and inserted into the plunger 301 formed of a magnetic material in the axial direction, and the one end of the needle 210 is inserted into the needle housing 211, thereby assembling the driving unit 200.

In operation S20, the plunger 301 and the needle housing 211, which are combined to the needle 210, are respectively inserted into and assembled to the inner circumferential surface of the guide pipe 400 having a cylindrical pipe shape.

Meanwhile, in the current embodiment, while assembling the driving unit 200, and the plunger 301 and the guide pipe 400, the plunger 301 and the needle housing 211 are respectively inserted into the needle 210 and then the guide pipe 400 is assembled. However, various embodiments are possible according to a shape of the needle housing 211. For example, the plunger 301 may be first assembled to the needle 210, and then the other end of the guide pipe 400 may be inserted into the outer circumferential surface of the plunger 301, and the needle housing 211 may be assembled to the one end of the guide pipe 400.

In operation S30, after assembling the plunger 301 and the needle housing 211 to the guide pipe 400 as described above, the guide pipe 400 is slidably inserted into and assembled to the insert hole 101 of the valve body 100.

At this time, according to the current embodiment, the non-magnetic material layer is formed in operation S40 in order to fix the guide pipe 400 and the valve body 100, and the guide pipe 400 and the needle housing 211.

In operation S40, the second non-magnetic material is brazed between the guide pipe 400 and the valve body 100 and between the guide pipe 400 and the needle housing 211 such that the second non-magnetic material is melted and permeated between the guide pipe 400 and the valve body 100 and between the guide pipe 400 and the needle housing 211. Here, the non-magnetic material layer includes the second non-magnetic material layer 520 disposed between the guide pipe 400 and the valve body 100, and the first non-magnetic material layer 510 disposed between the guide pipe 400 and the needle housing 211.

Referring to FIG. 9 with respect to operation S40, the non-magnetic material layer is formed by first forming a second non-magnetic material ring 501 having a ring shape and formed of the second non-magnetic material, inserting the second non-magnetic material ring 501 between the one end of the guide pipe 400 and the outer circumferential side surface of the needle housing 211, and then brazing the second non-magnetic material ring 501.

In order to easily insert the second non-magnetic material ring 501, an insert hole 410 may be formed between the needle housing 211 and the guide pipe 400. Here, a shape of the insert hole 410 is not limited as long as the second non-magnetic material ring 501 is inserted, for example, a triangular groove as shown in FIG. 9.

As described above, according to the current embodiment, by forming the second non-magnetic material ring 501 having the ring shape and formed of the second non-magnetic material, the second non-magnetic material ring 501 may be easily inserted into and fixed between the guide pipe 400 and the needle housing 211 and between the guide pipe 400 and the valve body 100, and the brazing may be performed at this time to easily form the non-magnetic material layer. In FIG. 9, the non-magnetic material layer is formed between the guide pipe 400 and the needle housing 211, and the non-magnetic material layer may be formed between the valve body 100 and the guide pipe 400 in the similar manner.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

The present invention may be used in a swash plate type compressor of an air conditioning device for a car.

The invention claimed is:

1. A control valve for a variable capacity compressor, the control valve comprising:
  a valve body externally comprising a crank-chamber port communicating with the crank chamber, a discharge port communicating with the discharge chamber, and a suction port communicating with the suction chamber, and internally comprising a control channel formed such that the crank-chamber port and the discharge port communicate with each other, and a first bleeding channel formed such that the crank-chamber port and the suction port communicate with each other;
  an operating unit provided inside the valve body and comprising a second bleeding channel communicating from a center area to a side surface of the operating unit, wherein the operating unit comprises:
  a plunger slidably combined to one end of a needle,
  a feed valve unit combined to the plunger to open or close the control channel by interworking and moving with the plunger, and comprising the second bleeding channel penetrating through an axial center area from an inlet hole formed at one end of the feed valve unit to communicate with an outlet hole formed at the outer circumferential side surface and communicate with the first bleeding channel, and
  a bleeding valve unit provided in the feed valve unit and adjusting opening and closing of the second bleeding channel; and
  a driving unit provided inside the valve body and reciprocally moving the operating unit according to a current applied from an external source, wherein the driving unit comprises:
  the needle disposed in the valve body, and
  a solenoid provided at the valve body to apply an operating force for reciprocally moving the operating unit,
  wherein when the variable capacity compressor is in a normal state, the control channel is opened and the first and second bleeding channels are closed, and thus the refrigerant in the discharge chamber flows through the control channel and enters the crank chamber, and
  when a pressure in the suction chamber is increased or the pressure of the crank chamber is in an abnormally high bleeding state, the operating unit is moved to close the control channel and the first and second bleeding channels are communicated with each other and opened, and thus the refrigerant in the crank chamber flows through the first and second bleeding channels and enters the suction chamber, thereby lowering the pressure in the crank chamber.

2. The control valve of claim 1, wherein, in the valve body, at least one crank-chamber port is formed at a side surface of one end, at least one discharge port is formed at an outer circumferential side surface, at least one suction port is spaced apart from the at least one discharge port at the outer circumferential side surface, the control channel is formed in an axial direction from the at least one crank-chamber port and in a circumferential direction towards the at least one discharge port, and the first bleeding channel is formed in the axial direction from the at least one crank-chamber port and in the circumferential direction towards the at least one suction port.

3. The control valve of claim 1, wherein the bleeding valve unit comprises:
  a bellows disposed in the feed valve unit and expanding or contracting according to the pressure of the suction chamber; and
  a bleeding valve body combined to the bellows and moving according to the expansion or contraction of the bellows to open or close the second bleeding channel.

4. The control valve of claim 3, further comprising: a support member whose one end is combined to the needle and the other end is combined to one end of the bellows to support the bellows; a spring combined to the support member; and a stopper combined to the spring and restricting the movement of the bleeding valve body.

5. The control valve of claim 3, wherein the bleeding valve body comprises:
  a valve sheet combined to the other end of the bellows; and
  a flow tube whose one end is combined to the valve sheet, an outer circumferential surface slidably moves while face-to-face contacting an inner circumferential surface of the feed valve unit, the other end comprises a though hole to communicate with the second bleeding channel, and an outer circumferential side surface comprises a discharge hole communicating with the second bleeding channel.

6. The control valve of claim 5, wherein the flow tube comprises at least one refrigerant groove for the refrigerant to flow in such that the flow tube slidably moves.

7. The control valve of claim 6, wherein the at least one refrigerant groove is formed in a spiral shape along an outer circumferential surface of the flow tube.

8. The control valve of claim 5, wherein the feed valve unit comprises a catching unit on the inner circumferential surface, and
  the valve sheet comprises a flange externally protruding along a circumferential direction on the outer circumferential surface to open or close the second bleeding channel by moving according to the expansion or contraction of the bellows to contact or be separated from the catching unit.

9. The control valve of claim 1, further comprising:
  a guide pipe disposed between the valve body and the operating unit, having a cylindrical pipe shape, having an inner circumferential surface into which the plunger is reciprocally movably inserted, and formed of a first non-magnetic material; and
  a first non-magnetic material layer disposed between the valve body and the guide pipe to fix the valve body and the guide pipe, and formed of a second non-magnetic material having a lower magnetic permeability than the first non-magnetic material.

10. The control valve of claim 9, further comprising a needle housing surrounding and combined to an outer circumferential surface of another end of the needle, wherein one end of the guide pipe extends to the needle housing to surround an outer circumferential surface of the needle housing, and the needle housing and the guide pipe are fixed by forming a second non-magnetic material layer formed of the second non-magnetic material between the needle housing and the guide pipe.

11. The control valve of claim 10, wherein the first and second non-magnetic material layers are formed as the second non-magnetic material melts and permeates between the valve body and the guide pipe and between the needle housing and the guide pipe via brazing.

12. The control valve of claim 10, wherein the guide pipe is formed of stainless steel (SUS), and the second non-magnetic material is formed of copper.

* * * * *